US012729911B2

(12) United States Patent
Garvin et al.

(10) Patent No.: US 12,729,911 B2
(45) Date of Patent: Sep. 8, 2026

(54) MONITORING VIAL CONDITIONS DURING A LYOPHILIZATION PROCESS

(71) Applicant: AMGEN INC., Thousand Oaks, CA (US)

(72) Inventors: Christopher John Garvin, Kingston, RI (US); Fabrice Schlegel, Cambridge, MA (US); Gioval Scalzo, Dublin (IE); Colm Bambury, Dublin (IE); Deniz Bac, Barrington, RI (US); Christian Ruitberg, Malibu, CA (US)

(73) Assignee: AMGEN INC., Thousand Oaks, CA (US)

( * ) Notice: Subject to any disclaimer, the term of this patent is extended or adjusted under 35 U.S.C. 154(b) by 768 days.

(21) Appl. No.: 17/924,925

(22) PCT Filed: May 11, 2021

(86) PCT No.: PCT/US2021/031713
§ 371 (c)(1),
(2) Date: Nov. 11, 2022

(87) PCT Pub. No.: WO2021/231382
PCT Pub. Date: Nov. 18, 2021

(65) Prior Publication Data

US 2023/0194166 A1 Jun. 22, 2023

Related U.S. Application Data

(60) Provisional application No. 63/023,482, filed on May 12, 2020.

(51) Int. Cl.
*F26B 5/06* (2006.01)
*F26B 21/35* (2026.01)

(52) U.S. Cl.
CPC ................ *F26B 5/06* (2013.01); *F26B 21/35* (2026.01)

(58) Field of Classification Search
CPC .. F26B 5/06; F26B 21/10; F26B 21/06; F26B 21/35; F26B 21/30
See application file for complete search history.

(56) References Cited

U.S. PATENT DOCUMENTS

2008/0098614 A1 * 5/2008 Tchessalov ............... F26B 5/06 34/284
2010/0107436 A1 5/2010 Velardi et al.
(Continued)

FOREIGN PATENT DOCUMENTS

CN 107429969 A 12/2017
CN 108519398 A 9/2018
(Continued)

OTHER PUBLICATIONS

Search Report and Written Opinion in International Application No. PCT/US2021/031713 dated Oct. 4, 2021, 30 pages.
(Continued)

*Primary Examiner* — Jessica Yuen
(74) *Attorney, Agent, or Firm* — MARSHALL, GERSTEIN & BORUN LLP

(57) ABSTRACT

A method of facilitating real-time monitoring of conditions within a vial during a lyophilization process occurring within a lyophilization chamber includes, for each of a plurality of time intervals during the lyophilization process, determining current values of temperature and pressure within the lyophilization chamber and, after each time interval, determining current values of one or more conditions within the vial. Determining the current values of the condition(s) within the vial includes applying those current values as inputs to a heat and mass transfer balance model and solving for a current value of a temperature within the
(Continued)

vial (and possibly water removed from or remaining within the product). The method also includes causing a display device to display the current value(s) of the condition(s) within the vial to a user, and/or controlling the temperature and/or pressure within the lyophilization chamber based on the current value(s) of the condition(s) within the vial.

29 Claims, 6 Drawing Sheets

(56) References Cited

U.S. PATENT DOCUMENTS

| | | | | |
|---|---|---|---|---|
| 2013/0006546 | A1 | 1/2013 | Fissore et al. | |
| 2015/0226617 | A1* | 8/2015 | Thompson | F26B 5/06 702/130 |
| 2019/0120535 | A1 | 4/2019 | Harms et al. | |
| 2019/0226760 | A1 | 7/2019 | Cakmak et al. | |

FOREIGN PATENT DOCUMENTS

| | | | |
|---|---|---|---|
| EP | 2674712 | A1 | 12/2013 |
| JP | 2012108470 | A | 6/2012 |
| JP | 2015-031486 | A | 2/2015 |
| JP | 2016-514824 | A | 5/2016 |
| JP | 2016-125682 | A | 7/2016 |
| JP | 2016-523353 | A | 8/2016 |
| WO | WO-2008/042408 | A2 | 4/2008 |
| WO | WO-2014/160831 | A1 | 10/2014 |
| WO | WO-2014/209703 | A1 | 12/2014 |
| WO | WO-2016/123062 | A1 | 8/2016 |

OTHER PUBLICATIONS

Japanese Patent Application No. 2022-568419, Notice of Reasons for Refusal, dated Mar. 4, 2025.

* cited by examiner

500

MONITORING VIAL CONDITIONS DURING A LYOPHILIZATION PROCESS

FIELD OF THE DISCLOSURE

The present application relates generally to lyophilization, and more specifically to the monitoring and/or control of conditions in a vial (e.g., internal temperature and the amount of water removed from the product) during a lyophilization process, such as may be used in the commercial manufacture of a drug product.

BACKGROUND

An important step in the manufacture of many pharmaceutical drug products is lyophilization, or "freeze drying." In the lyophilization process, a vial containing the drug product is placed within a special lyophilization chamber. The product is first frozen by reducing the temperature within the chamber, the chamber is then evacuated, and finally heat is added to the product to cause water (ice) in the product to sublimate (i.e., transition directly from the solid state to a gaseous state). By removing moisture from the product in this manner, the product can be made more stable (i.e., have a longer shelf life).

The lyophilization process, which typically lasts days or even weeks, can damage the product if an appropriate temperature/pressure profile over time is not maintained. For example, the dried "cake" that forms during the lyophilization process may collapse if a critical temperature is surpassed, or the product may melt back and/or retain too much moisture (and therefore have a shorter shelf life) if a temperature drop causes the process to be too short. Developing the right lyophilization process is far from trivial, however, as the success of a given process generally depends on properties of the product, the lyophilization chamber, and the vial. Moreover, the process is complicated by the fact that, for clinical/commercial production, regulatory requirements do not permit the use of sensors/probes within the vial containing the drug product. Thus, while the temperature and pressure of the lyophilization chamber may be set to a particular level (in accordance with the recipe), conditions within the vial itself (e.g., temperature and amount of water removed from the product) are not directly measured.

A conventional process 200 for developing a lyophilization recipe is illustrated in FIG. 2. Initially, at stage 202, engineers develop a recipe at lab-scale (i.e., at a smaller scale using laboratory equipment rather than commercial production equipment). Stage 202 can entail calculating set points for the chamber temperature and pressure using known equations that model the relation of those set points to the temperature of the product and the amount of water removed from the product, at a time prior to the beginning of the lyophilization process. For example, the equations described in *Mass and Heat Transfer in Vial Freeze-Drying of Pharmaceuticals: Role of the Vial*, Journal of Pharmaceutical Sciences, Vol. 73, No. 9, September 1984, pp. 1224-37 (Pikal et al.) may be used to determine the chamber temperature and pressure set points. Further, because the above-noted regulatory requirements do not apply within the laboratory, stage 202 may entail obtaining in-vial measurements of temperature and/or water amounts (e.g., the fraction of water removed from the product) throughout the course of lyophilization. In this manner, a lab-scale relation between chamber temperature, chamber pressure, and in-vial conditions may be mapped out.

At stage 204, the results of the lab-scale lyophilization are assessed. For example, the lyophilized product may be analyzed to determine whether moisture is sufficiently low, and to confirm that there is no cake collapse, etc. If performance is inadequate, lab-scale development continues at stage 202. If performance is suitable, however, a commercial-scale recipe is developed at stage 206, using the same commercial lyophilization equipment that will be used during the final stages of drug manufacture. The development at stage 206 may use the lab-scale recipe as a starting point, often with safety factors added to account for differences between commercial and lab-scale equipment. At stage 208, the results of the commercial-scale lyophilization are assessed (e.g., similar to stage 204). If performance is inadequate, commercial-scale development continues at stage 206. If performance is suitable (e.g., based on a rigorous qualification process), the lyophilization recipe may be implemented during commercial manufacture of the drug product.

As a whole, the process 200 can be very time consuming, with stage 206 alone potentially requiring weeks of work. Lengthy development efforts at stage 206 are particularly undesirable, because the use of commercial lyophilization equipment for recipe development generally prevents the use of that equipment for commercial-scale drug manufacture. Another significant drawback of the recipe development process 200 is that it assumes that the temperature and pressure within the lyophilization chamber can be tightly controlled. In reality, deviations of temperature and pressure within the chamber (relative to control settings) are not uncommon. Thus, even if the recipe developed via the process 200 generally provides good results, these deviations can lead to a significant number of rejects that must be discarded and, correspondingly, higher manufacturing costs.

BRIEF SUMMARY

Systems and methods described herein generally employ a scalable, soft-sensor deployment framework for real-time monitoring systems, to enable more agile decision making and/or to control/optimize the processes being monitored. More specifically, embodiments described herein provide real-time monitoring of conditions within a vial during a lyophilization process occurring in a lyophilization chamber. As used herein, the term "vial" refers to any container that can hold a material, and that permits lyophilization of that material when suitable temperature and pressure conditions are applied. While techniques are described below with reference to drug products, it is understood that the techniques may instead be used in other, non-pharmaceutical contexts (e.g., for freeze drying other types of products to enhance shelf life).

Real-time monitoring of in-vial conditions (e.g., temperature and amount of water removed from the product) is achieved via "soft sensing," without necessarily introducing any sensor/probe hardware inside the vial during product manufacture. Thus, regulatory prohibitions against introducing such hardware can be satisfied. Instead, in-vial conditions are soft sensed based on temperature and pressure measured using sensor/probes within the lyophilization chamber, but external to the vial. The chamber temperature and pressure are measured at a number of time intervals (e.g., at regular time intervals such as every minute, etc.), with the measured values at each time interval being applied to a mechanistic (first-principles-based), combined heat and mass transfer balance model to infer/calculate in-vial conditions at those time intervals. The heat and mass transfer balance model may also take other parameters into account, such as properties of the product/formulation (e.g., cake resistance) and/or properties of the vial (e.g., heat transfer coefficient and/or geometric properties). In some embodiments, the model is also used to predict future values of the in-vial conditions over a suitable time window (e.g., the next hour, the next two hours, etc.). The model may include (or be derived from) the equations presented in *Mass and Heat Transfer in Vial Freeze-Drying of Pharmaceuticals: Role of the Vial*, Journal of Pharmaceutical Sciences, Vol. 73, No. 9, September 1984, pp. 1224-37 (Pikal et al.), for example, the entirety of which is hereby incorporated herein by reference. In other embodiments, a different model is used. For example, the model may include (or be derived from) the equations presented in *Numerical Solutions of Moving Boundary Transport Problems in Finite Media by Orthogonal Collocation*, Computers & Chemical Engineering, Vol. 3, 1979, pp. 615-21 (Liapis et al.), the entirety of which is hereby incorporated herein by reference. In still other embodiments, the model may include a 3D finite element analysis (FEA) model of the full vial, and/or may couple a vial model to a computational fluid dynamics (CFD) model of the lyophilization chamber.

The current and predicted in-vial conditions may be displayed to a user, and/or may be used to generate feedback signals for automatically controlling/adjusting the chamber temperature and/or pressure. Whether the chamber temperature and pressure are manually controlled or automatically controlled, these techniques can improve upon traditional techniques by accounting for unexpected deviations in chamber temperature and pressure. For example, a user observing a spike in the measured chamber temperature, along with a predicted in-vial (product) temperature near or above the critical temperature, may decide to manually decrease the chamber temperature setting in order to avoid a cake collapse event, or a control algorithm may automatically effect such an increase. This real-time manual or automated control is not possible with conventional techniques, in which mathematical models are used (if at all) merely to form approximate, initial estimates of appropriate chamber temperature and chamber pressure settings (e.g., as an initial step of stage 202 in FIG. 2), prior to the start of the lyophilization process. Thus, the systems and methods described herein can reduce waste/costs due to temperature/pressure deviations during the lyophilization process. Moreover, the agility/adaptability provided by real-time monitoring, with manual or automated feedback/control, may lessen the need to identify an optimal, "lowest failure rate" recipe for a given product and vial, thereby reducing the amount of time required for commercial-scale recipe development. For example, stage 206 of FIG. 2 may be shortened, or skipped entirely.

BRIEF DESCRIPTION OF THE DRAWINGS

The skilled artisan will understand that the figures described herein are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
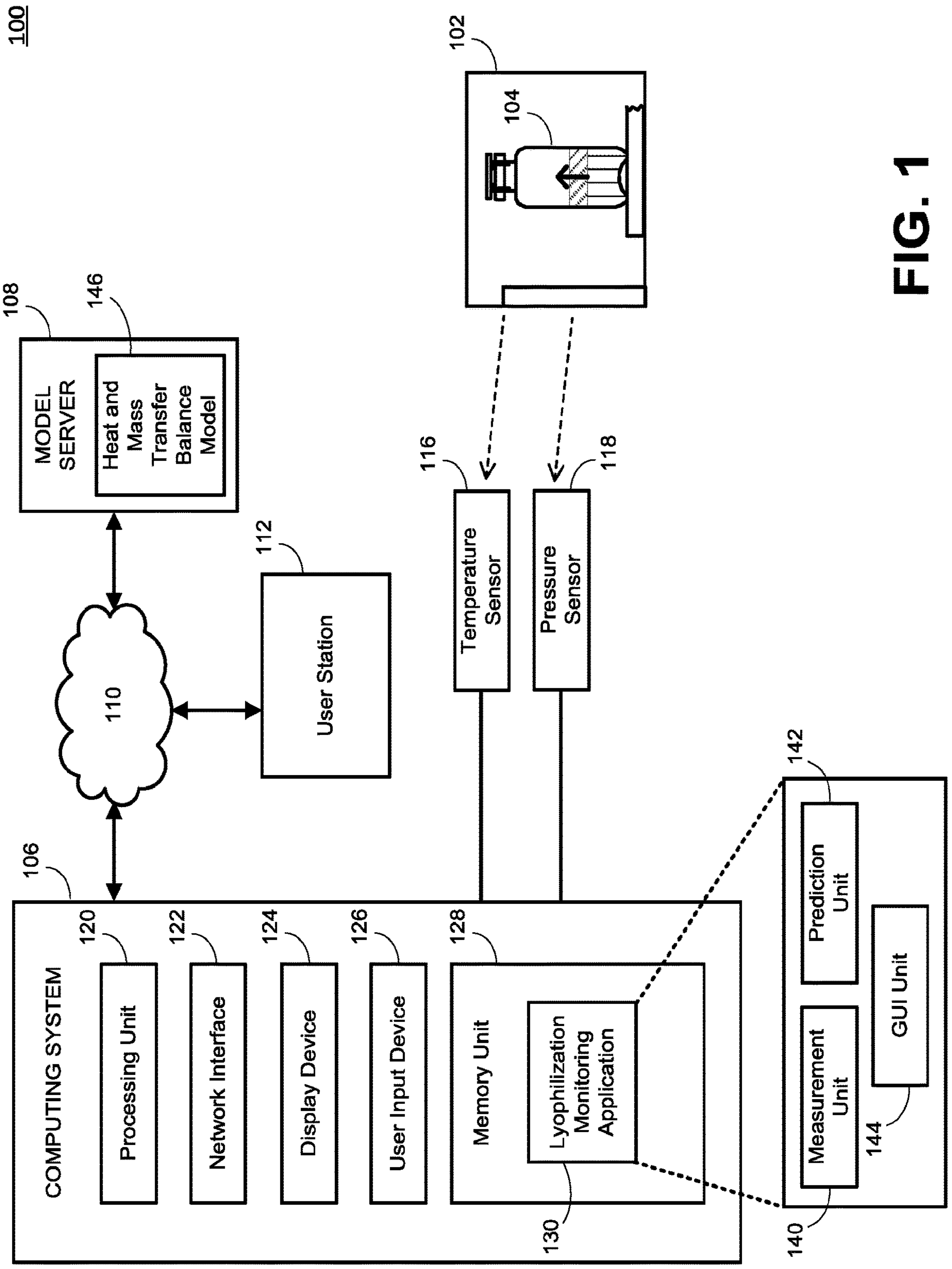
FIG. 1 is a simplified block diagram of an example system that may be used to manually monitor and control a lyophilization process.
Figure 2:
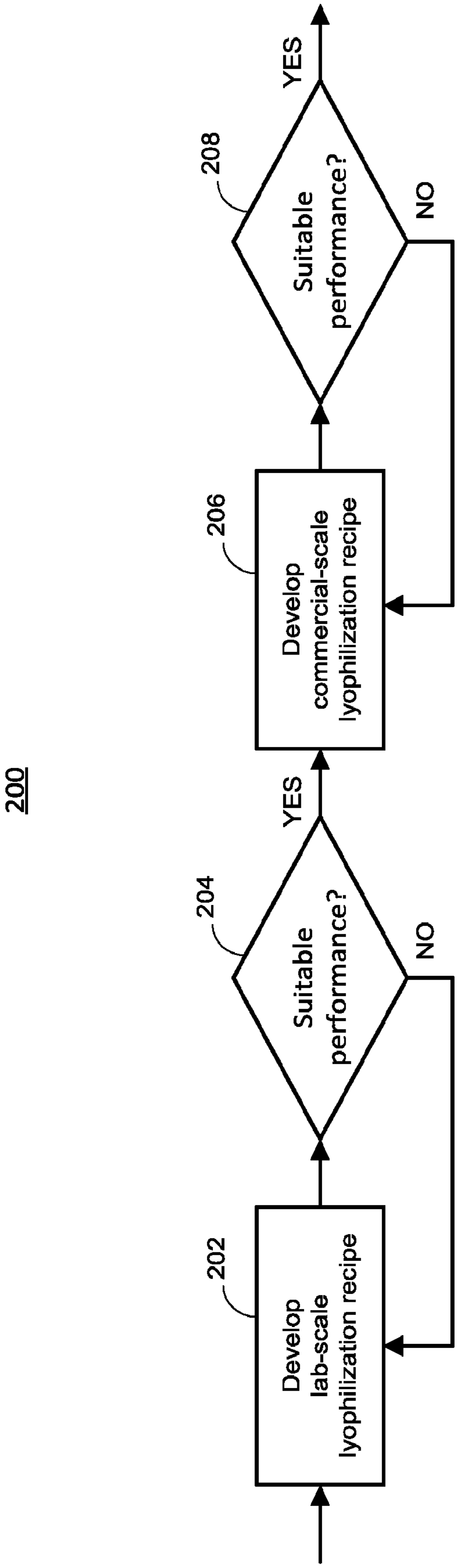
FIG. 2 (PRIOR ART)
FIG. 2 is a block diagram of a conventional process for developing a commercial-scale lyophilization recipe.

FIG. 1 is a simplified block diagram of an example system 100 that may be used to manually monitor and control a lyophilization process in real-time. As used herein, "real-time" monitoring refers to monitoring during the lyophilization process. Thus, real-time monitoring may be almost immediate (e.g., to reflect conditions within milliseconds of those conditions existing within a vial), or may be noticeably delayed (e.g., by seconds or even minutes), depending on the embodiment. While FIG. 1 depicts a system 100 that lyophilizes drug products within vials, it is understood that, in other embodiments, the system 100 may be used to lyophilize other types of products in other contexts.

The system 100 includes a lyophilization chamber 102 configured to accept a vial 104 and, when closed, provide a fluid seal between the interior of the chamber 102 and the environment external to the chamber 102. The chamber 102 includes, or is coupled to, a temperature control device (e.g., a heating element, and possibly also a cooling element) for changing the temperature within the sealed chamber 102, as well as a pressure control device (e.g., a vacuum pump) for changing the pressure within the sealed chamber 102. The chamber 102 is discussed in more detail below with reference to FIG. 3, according to one embodiment.

The example system 100 also includes a computing system 106 and a model server 108, coupled to each other via a network 110. The system 100 further includes a user station 112, which may be coupled to the computing system 106 (and/or to the model server 108) via the network 110 or another suitable network. The network 110 may be a single communication network or may include multiple communication networks of one or more types (e.g., one or more wired and/or wireless local area networks (LANs), and/or one or more wired and/or wireless wide area networks (WANs) such as the Internet or an intranet, for example).

The computing system 106 is communicatively coupled to both a temperature sensor 116 and a pressure sensor 118. The temperature sensor 116 and pressure sensor 118 are configured to measure a temperature and a pressure, respectively, within the chamber 102 but external to the vial 104, as discussed further below with reference to FIG. 3. Generally, and as discussed in further detail below, the computing system 106 accesses the model server 108 to process measurements from the sensors 116, 118 and generate real-time data reflecting current conditions (e.g., temperature and amount of water removed from the product), as well as predicted future conditions, within the vial 104, while the user station 112 enables an on-site or remote user (e.g., scientist or engineer) to view that real-time data in order to make in-process control decisions (e.g., increasing or decreasing temperature and/or pressure within the chamber 102 via the temperature and/or pressure control devices discussed above).

The computing system 106 may be a server, a desktop computer, a laptop computer, a tablet device, or any other suitable type of computing device or devices. In the example embodiment shown in FIG. 1, the computing system 102 includes a processing unit 120, a network interface 122, a display device 124, a user input device 126, and a memory unit 128. In some embodiments, however, the computing system 106 includes two or more computers that are either co-located or remote from each other. In these distributed embodiments, the operations described herein relating to the processing unit 120, network interface 122 and/or memory unit 128 may be divided among multiple processing units, network interfaces and/or memory units, respectively.

The processing unit 120 includes one or more processors, each of which may be a programmable microprocessor that executes software instructions stored in the memory unit 128 to execute some or all of the functions of the computing system 106 as described herein. Alternatively, some of the processors in the processing unit 120 may be other types of processors (e.g., application-specific integrated circuits (ASICs), field-programmable gate arrays (FPGAs), etc.), and some of the functionality of the computing system 106 as described herein may instead be implemented, in part or in whole, in hardware. The memory unit 128 may include one or more physical memory devices or units containing volatile and/or non-volatile memory. Any suitable memory type or types may be used, such as read-only memory (ROM), solid-state drives (SSDs), hard disk drives (HDDs), and soon.

The network interface 122 may include any suitable hardware (e.g., front-end transmitter and receiver hardware), firmware, and/or software configured to communicate via the network 110 using one or more communication protocols. For example, the network interface 122 may be or include an Ethernet interface.

The display device 124 may use any suitable display technology (e.g., LED, OLED, LCD, etc.) to present information to a user, and the user input device 126 may be a keyboard or other suitable input device. In some embodiments, the display device 124 and the user input device 126 are integrated within a single device (e.g., a touchscreen display). Generally, the display device 124 and the user input device 126 may jointly enable a user to interact with graphical user interfaces (GUIs) provided by the computing system 106, e.g., for purposes such as manually monitoring the lyophilization process occurring within the chamber 102. In some embodiments, however, the computing system 106 does not include the display device 124 and/or the user input device 126 (e.g., in some embodiments where inferred/predicted values, or GUIs generated based on those values, are only sent to a remote device such as the user station 112).

The memory unit 128 stores the instructions of one or more software applications, including a lyophilization monitoring application 130. The lyophilization monitoring application 130, when executed by the processing unit 120, is generally configured to communicate with the sensors 116, 118 and the model server 108 to infer and predict conditions (e.g., temperature and amount of water removed from the product) within a vial (e.g., the vial 104) based on current temperature and pressure values within the chamber 102. To this end, the application 130 includes a measurement unit 140, a prediction unit 142, and a GUI unit 144. It is understood that the various units of application 130 may be distributed among different software applications, and/or that the functionality of any one such unit may be divided among different software applications.

The measurement unit 140, when executed by the processing unit 120, obtains temperature and pressure measurements from the sensors 116, 118, preferably at regular time intervals (e.g., every minute, or every five minutes, etc.). The prediction unit 142 provides the measurements/Values for each time interval to the model server 108 in real-time, by causing the computing system 106 to transmit the data to the model server 108 via the network interface 122 and the network 110. The model server 108 then applies those measurements/values as inputs to a heat and mass transfer balance model 146 stored in a memory unit of the model server (not shown in FIG. 1). The heat and mass transfer balance model 146 is a mechanistic/first-principles model that relates conditions within a vial (e.g., the vial 104) to conditions external to the vial (e.g., within the chamber 102 but external to the vial 104). An example set of equations that may constitute some or all of the heat and mass transfer balance model 146 is discussed below.

The model server 108 may execute (or otherwise make available) the heat and mass transfer balance model 146, and exchange data with the computing system 106, as part of a web services model, for example. In other embodiments, however, the system 100 does not include the server 108, and the computing system 106 locally stores the heat and mass transfer balance model 128 (e.g., in the memory unit 128), and locally executes the heat and mass transfer balance model 146 (e.g., by the processing unit 120 when executing the instructions of the prediction unit 142).

For each time interval, the model server 108 uses the model 146 to calculate values for the conditions (e.g., temperature and amount of water removed from the product) within the vial 104, and returns the calculated values to the prediction unit 142 via the network 110. The application 130 stores the values within the memory unit 128 (or another suitable memory), and the GUI unit 144 arranges for presentation of the stored values to a user in a suitable format. For example, the GUI unit 144 may generate a graph showing past, current and predicted/future values for conditions within the vial 104, such as the graph discussed below with reference to FIG. 5, and cause the display device 124 to display the graph. Alternatively or additionally, the GUI unit 144 may cause the display device 124 to show the past, current and future values in a table format, or in some other suitable format.

In some embodiments, the GUI unit 144 instead, or also, communicates with the user station 112 (and possibly one or more other, similar stations) to cause the user station 112 (and any other such stations) to display the GUI. The user station 112 may be a desktop computer, a laptop computer, a tablet device, a smartphone, or any other suitable type of computing device, and may include or be coupled to a display device (e.g., similar to device 124) and a user input device (e.g., similar to device 126). In this manner, real-time monitoring may be provided to one or more on-site and/or remote users.

It is understood that other configurations and/or components may be used instead of those shown in FIG. 1. For example, a different computing device or system (not shown in FIG. 1) may transmit measurements provided by the sensors 116, 118 to the model server 108, one or more additional computing devices or systems may act as intermediaries between the computing system 106 and the model server 108, some of the functionality of the computing system 106 as described herein may instead be performed remotely by the model server 108 and/or another remote server, and so on.

Figure 3:
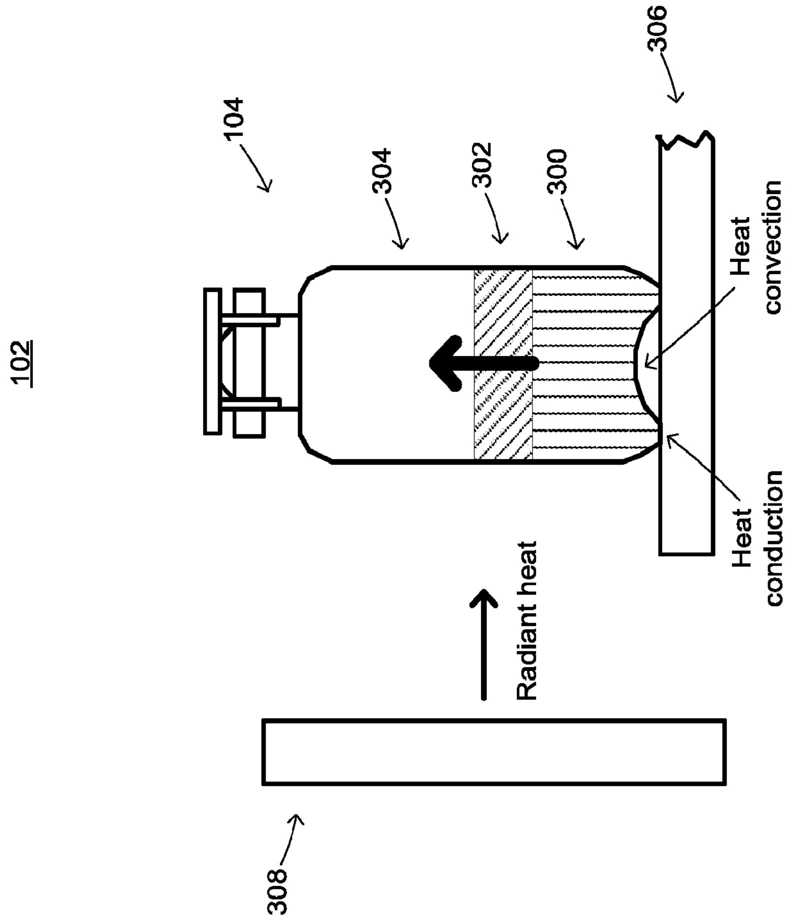
FIG. 3 depicts an example lyophilization chamber that may be used in the system of FIG. 1.

FIG. 3 depicts an example embodiment of the lyophilization chamber 102 used in the system 100 of FIG. 1. As seen in FIG. 3, the vial 104 includes, at least at some point during lyophilization, a frozen product layer 300, a cake layer 302, and a gas layer 304. The upward pointing arrow in FIG. 3 indicates the flow of vapor from the frozen product layer 300 through the cake layer 302 as lyophilization occurs. The example chamber 102 includes a lyophilizer shelf 306 on which the vial 104 rests, and a lyophilizer wall (or door) 308 that may be substantially perpendicular to the shelf 306 and is spaced apart from the vial 104. The shelf 306 includes, or is thermally coupled to, one or more heating elements (not shown in FIG. 3) and warms the vial 104 by heat conduction (where the vial 104 is in direct contact with the shelf 306) as well as heat convection (where an air gap separates the bottom of the vial 104 from the shelf 306). The wall 308 provides the vial 104 with radiant heat. The wall 308 may be thermally coupled (e.g. attached) to the shelf 306, and/or may form a cylinder that extends around some or all of the circumference of the vial 104. For example, the shelf 306 and wall 308 may be portions of a single, cylindrical container (e.g., with a removable top not shown in FIG. 3). It is understood that, in other embodiments, the chamber 102 used in the system 100 may be different than that shown in FIG. 3.

The heat and mass transfer balance model 146 models the heat energy input to the vial 104 (e.g., via the heat conduction, heat convection, and radiant heat shown in FIG. 3), as well as the heat energy consumed by sublimation within the vial 104. More precisely, the model 146 may set the input heat energy equal to the consumed heat energy. To more accurately model the lyophilization process, the model 146 may account for one or more properties of the chamber 102 and/or vial 104, and/or one or more properties of the product/formulation within the vial 104.

An example set of equations that may constitute at least a portion of the model 146 will now be described, with the understanding that, in other embodiments, the model 146 may differ in one or more respects from what follows (e.g., by incorporating suitable constants/coefficients, utilizing more or fewer terms to account for more or fewer physical phenomena, and soon). In some alternative embodiments, for example, the model 146 may incorporate (or be derived from) the equations presented in *Numerical Solutions of Moving Boundary Transport Problems in Finite Media by Orthogonal Collocation*, Computers & Chemical Engineering, Vol. 3, 1979, pp. 615-21 (Liapis et al.), or may include a 3D FEA model of the full vial (and/or couple a vial model to a CFD model of the lyophilization chamber 102), etc.

In this particular embodiment, the model 146 accounts for the heat transfer coefficient of the vial 104 (as a function of the pressure within the chamber 102), the geometry of the vial 104 (i.e., specific surface areas), and the cake resistance of the dried product (as a function of the height of the cake). The model 146 sets the input heat energy equal to the heat energy consumed via sublimation:

$$\text{heat}_{in}=\text{heat}_{out} \qquad \text{Equation (1)}$$

The model 146 also applies an ordinary differential equation to solve for the change in the mass of water that has been sublimated ($\text{mass}_{ice}$):

$$\frac{d(\text{mass}_{ice})}{dt}=\frac{\text{heat}_{in}}{\Delta H_s} \qquad \text{Equation (2)}$$

In Equation (2), $\Delta H_s$ is the heat, or enthalpy, of sublimation. The model 146 may directly calculate the change in the height of the frozen cake layer 302 from the change in the mass of sublimated water as determined in Equation (2) above.

The model 146 defines the quantity $\text{heat}_h$ in Equations (1) and (2) as:

$$\text{heat}_{in}=\text{area}_{vial_{outer}}*K_{vial}*\text{Max}[(T_{shelf}-T_{product}),eps] \qquad \text{Equation (3)}$$

where $\text{area}_{vial_{outer}}$ is the surface area of a horizontal, exterior cross section of the vial 104 (i.e., the area of a circle having a diameter equal to the outer diameter of the vial 104), $K_{vial}(P_{chamber})$ is the heat transfer coefficient of the vial 104 (as a function of the pressure $P_{chamber}$ within the chamber 102, e.g., as measured by the pressure sensor 118), $T_{shelf}$ is the temperature of the shelf 306 (e.g., as measured by the temperature sensor 116), $T_{product}$ is the product within the vial 104 (i.e., one of the conditions that the model 146 solves for), and eps is a constant chosen to ensure a stable solution. To solve Equation (3), the model 146 calculates the heat transfer coefficient of the vial 104 as follows:

$$K_{vial}=ht_a+\frac{ht_b*P_{chamber}}{1+ht_c*P_{chamber}} \qquad \text{Equation (4)}$$

In Equation (4), $ht_a$, $ht_b$, and $ht_c$ are arbitrary coefficients derived from (e.g., using curve fitting) experimental measurements for the specific combination of the vial 104 and the lyophilization chamber 102. These coefficients have a constant value and characterize the amount of heat transferred from the chamber 102 to the vial 104. The heat transfer coefficients may be determined (i.e., new measurements may be taken) whenever a new vial/lyophilizer combination is introduced, for example.

The model 146 defines the quantity $\text{heat}_{out}$ in Equation (1) as:

$$\text{heat}_{out}=\frac{\text{area}_{vial_{inner}}*\Delta H_s*(P_{subl\ surf}-P_{chamber})}{R(height_{dry\ layer})} \qquad \text{Equation (5)}$$

where $\text{area}_{vial_{inner}}$ is the surface area of a horizontal, interior cross section of the vial 104 where the cake layer 302 meets the gas layer 304 (i.e., the area of a circle having a diameter equal to the inner diameter of the vial 104), $P_{subl\ surf}$ is the pressure at the sublimation surface, and $R(\text{height}_{dry\ layer})$ is the cake resistance as a function of $\text{height}_{dry\ layer}$ (i.e., the height of the cake layer 302). The model 146 solves for the cake resistance in Equation (5) as follows:

$$R=\max\left[R_{R0}+\frac{R_{A1}*height_{dry\ layer}}{1+R_{A2}*height_{dry\ layer}},\ eps\right] \qquad \text{Equation (6)}$$

where $R_{R0}$, $R_{A1}$, and $R_{A2}$ are constants derived from (e.g., using curve fitting) experimental measurements for the particular product in the vial 104, and/or for the particular program involving that product. The constants may be determined (i.e., new measurements may be taken) whenever a new product/program is introduced, for example.

The model 146 solves for the sublimation surface pressure in Equation (5) as follows:

$$P_{subl\ surf}=e^{C1-(C2/T_{subl\ surf})} \quad \text{Equation (7)}$$

where $C_1$ and $C_2$ are constants and $T_{subl\ surf}$ is the temperature at the sublimation surface. The model 146 defines $T_{subl\ surf}$ as:

$$T_{subl\ surf} = T_{product} - \frac{\text{heat}_{in}}{\text{area}_{vial_{outer}}} * \frac{(h_{frozen} - \text{height}_{dry\ layer})}{\lambda} \quad \text{Equation (8)}$$

where $h_{frozen}$ is the height of the frozen product at the beginning of primary drying (i.e., fill volume times product density, divided by ($rho_{ice}$*$area_{vial_{inner}}$), where $rho_{ice}$ is the density of ice), and A is the thermal conductivity of the frozen cake layer 302. The model 146 defines the height of the cake layer 302 in Equations (6) and (7) as:

$$\text{height}_{dry\ layer} = \frac{\text{mass}_{ice}}{\text{water\_content} * rho_{ice} * \text{area}_{vial_{inner}}} \quad \text{Equation (9)}$$

where the model 146 calculates $mass_{ice}$ based on the mass from the previous time interval and the change in mass determined using Equation (2), and water_content is the mass fraction of water in the drug product. A drug product is generally made of water, the active ingredient/protein, and excipients, and water_content indicates how much water needs to be sublimated from the vial 104.

Using these or other suitable equations, the server 108 (or computing system 106) can use the current chamber temperature measured by the temperature sensor 116 ($T_{shelf}$), and the current chamber pressure measured by the pressure sensor 118 ($P_{chamber}$), to solve Equations (1) and (2) for the temperature of the product within the vial 104 ($T_{product}$) and the amount (e.g., fraction) of water removed via sublimation from the vial 104 (e.g., the amount of water removed from the product as determined from the change in $mass_{ice}$ since the last time interval). As noted above, in some embodiments, the server 108 (or computing system 106) uses the model 146 not only to calculate/infer current values for temperature and the amount of removed water, but also to predict those values at one or more future time intervals. The model 146 may predict the future values by assuming that $T_{shelf}$ and $P_{chamber}$ will remain constant over the prediction time window. At each time interval, however, the server 108 or computing system 106 may update these predictions based on a new assumption (i.e., by assuming that $T_{shelf}$ and $P_{chamber}$ will remain constant at their newly measured values).

In some embodiments, the server 108 (or computing system 106) implements an "orchestrator" algorithm that stores intermediate data in memory (e.g., memory unit 128 or a similar memory unit of server 108) and runs the model 146. The orchestrator algorithm keep may track of (i) the final values of the vial temperature and fraction of water removed for the prior time interval (e.g., a previous five-minute time interval), or (ii) the full time history of the measured shelf and temperature values since the beginning of primary drying.

Figure 4:
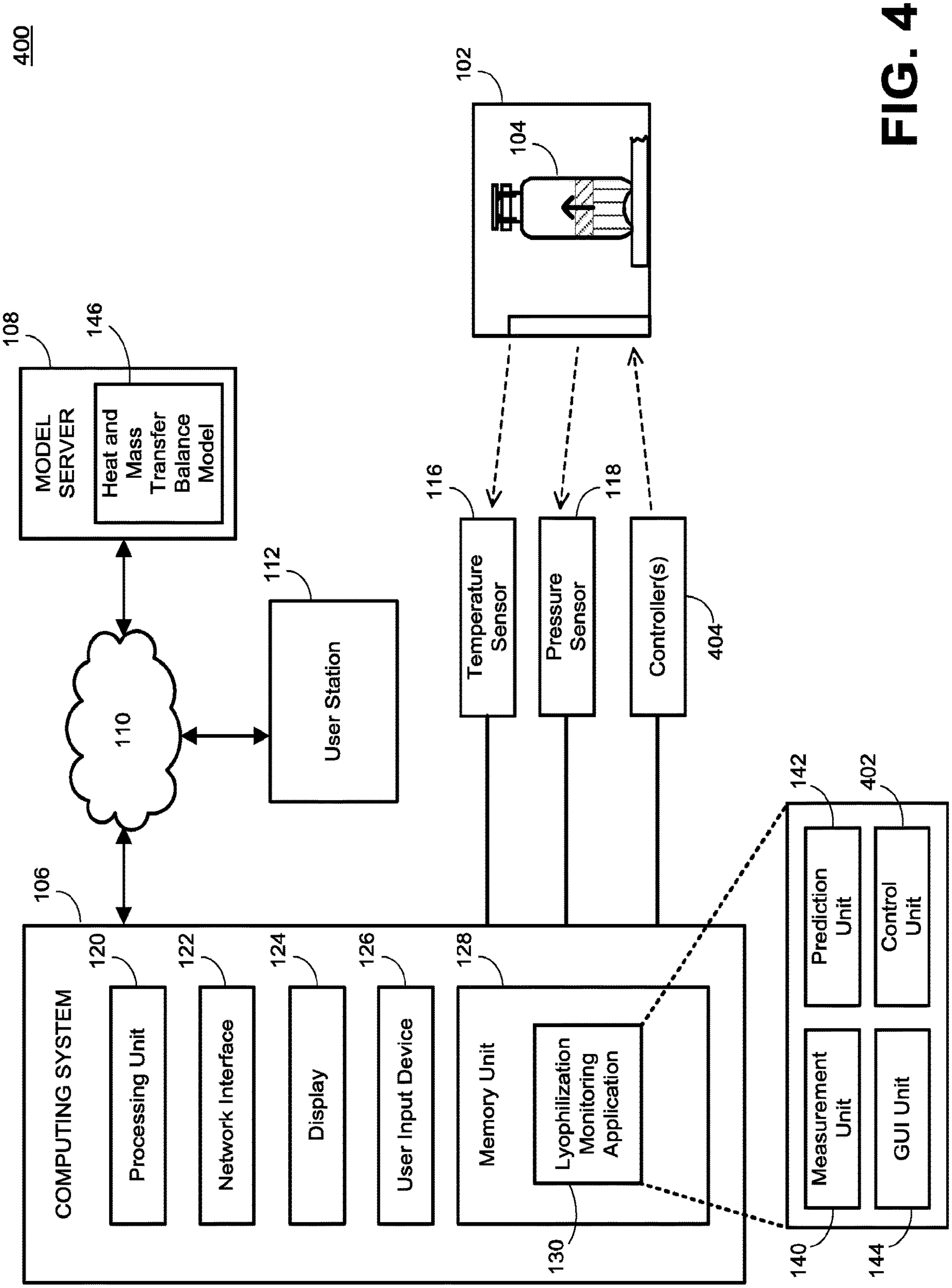
FIG. 4 is a simplified block diagram of an example system that may be used to provide automated, closed-loop control of a lyophilization process.

In some embodiments, the computing system 106 may use the inferred and/or predicted conditions in the vial 104 (e.g., temperature and amount of water removed from the product) to control the temperature and/or pressure in the chamber 102, using feedback in a closed-loop control system. FIG. 4 depicts one such system 400. In FIG. 4, the same reference numbers are used to indicate the corresponding components from FIG. 1. As seen in FIG. 4, within the system 400, the application 130 is used not only for real-time monitoring, but also for real-time control, and therefore includes a control unit 402.

The control unit 402 is configured to generate feedback signals to one or more controllers 404 based on the conditions inferred and/or predicted by the heat and mass transfer balance model 146. The controller(s) 404 may include a temperature controller coupled to one or more heating elements of the shelf 306 and a pressure controller coupled to a vacuum pump of the chamber 102, for example. The controller(s) 404 may comprise software instructions that are executed by one or more processors, for example, and/or appropriate firmware and/or hardware. The control unit 402 may implement any suitable algorithm to control the temperature and pressure in the chamber 102 in a manner that lessens the likelihood of failure/rejects (e.g., cake collapse). As just one example, the control unit 402 may implement a model predictive control (MPC) technique, using the predicted in-vial temperature and the predicted amount of water removed from the product over a fixed future time window (e.g., the next half hour, or the next two hours, etc.) as inputs in a closed-loop architecture, and the controller(s) may implement proportional-integral-derivative (PID) architectures.

Figure 5:
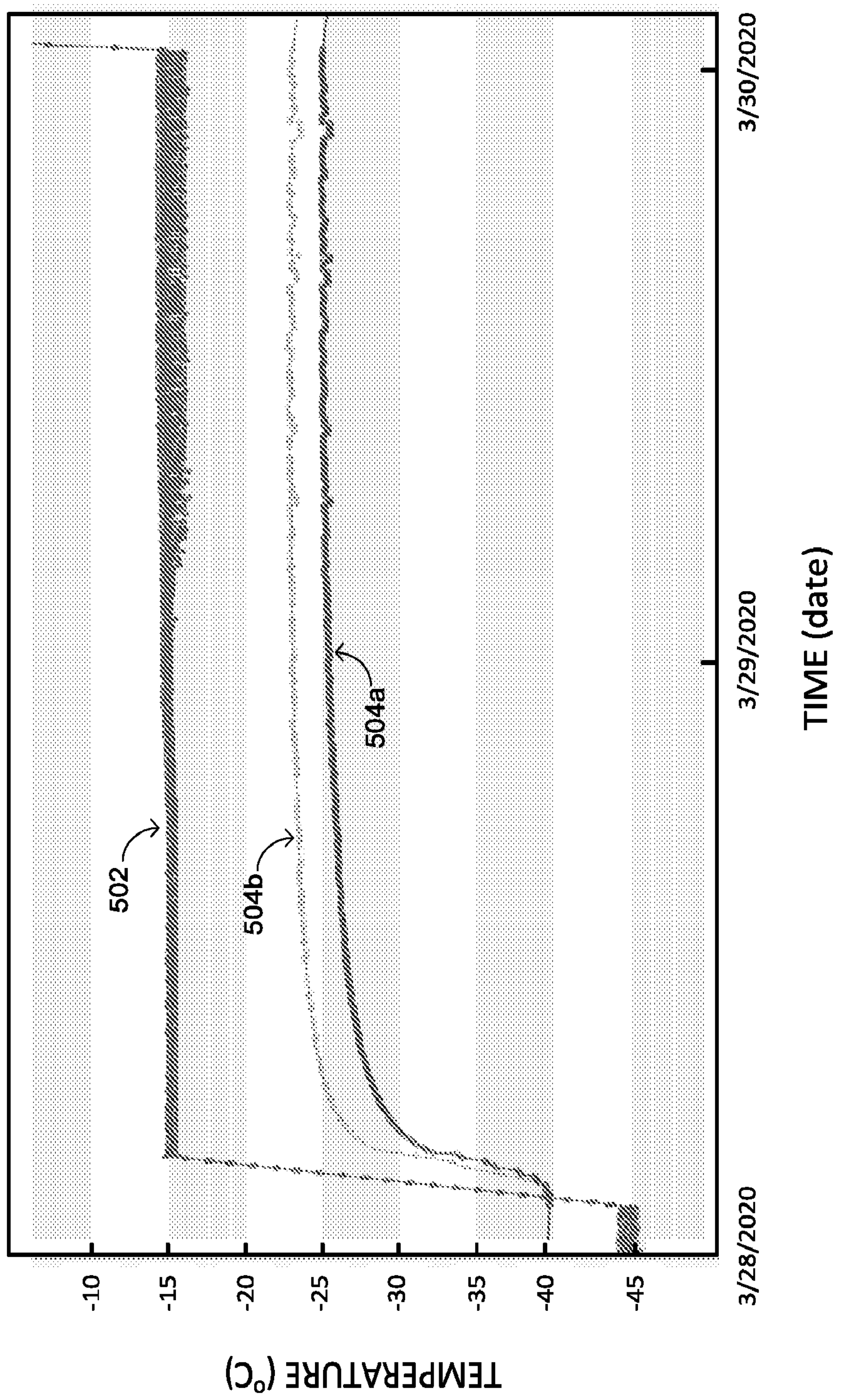
FIG. 5 depicts an example user interface that may be presented to a user of the system of FIG. 1 or a user of the system of FIG. 4.

FIG. 5 depicts an example user interface 500 that may be presented to a user of the system 100 of FIG. 1 or the system 400 of FIG. 4. The user interface 500 may be populated and/or generated by the GUI unit 144, for example, and may be displayed by the display device 124 and/or a similar display device of the user station 112.

The user interface 500 includes a graph of temperature over time, with data points of a trace 502 representing measured temperatures within the chamber 102 (e.g., values of $T_{shelf}$ measured every five minutes, or at some other suitable time interval). As seen in FIG. 5, the chamber (e.g., shelf) temperature reflected by trace 502 is not fixed and can vary over several degrees Celsius even if a fixed temperature setting is applied (e.g., to controller(s) 404). As can also be seen in FIG. 5, a range of inferred/predicted values for product temperature (e.g., $T_{product}$) is indicated by minimum values (corresponding to trace 504*a*) and maximum values (corresponding to trace 504*b*). The model 146 may solve for these minimum and maximum values based on uncertainties or ranges in any of the parameters used (e.g., in Equations (1) through (9)), such as an accuracy range for the measured temperature in the chamber 102, for example. In other embodiments, the user interface 500 only includes a single trace for the inferred/predicted temperatures, rather than min and max traces 504*a*, 504*b*.

FIG. 5 reflects the user interface 500 at a time when the lyophilization process has been completed (i.e., where all the data shown is historical data). It is understood, however, that the depicted graph may have been dynamically generated/updated with each time interval (e.g., every five minutes), starting when the lyophilization process began and continuing until the lyophilization process ended. Moreover, while the GUI unit 144 generates/updates the user interface 500, the traces 504*a* and 504*b* may extend further along the time axis than the trace 502, with the additional data points of the traces 504*a* and 504*b* (relative to the data points of the trace 502) reflecting the predicted future values of the chamber temperature, as calculated using the model 146.

In some embodiments, the GUI unit 144 similarly generates/updates a trace of inferred and predicted amounts (e.g., fractions) of water removed from the product within the vial 104 (e.g., using another scale on the right-hand side of the graph in FIG. 5, or in a separate graph), and/or updates a trace of the measured pressure within the chamber 102.

Figure 6:
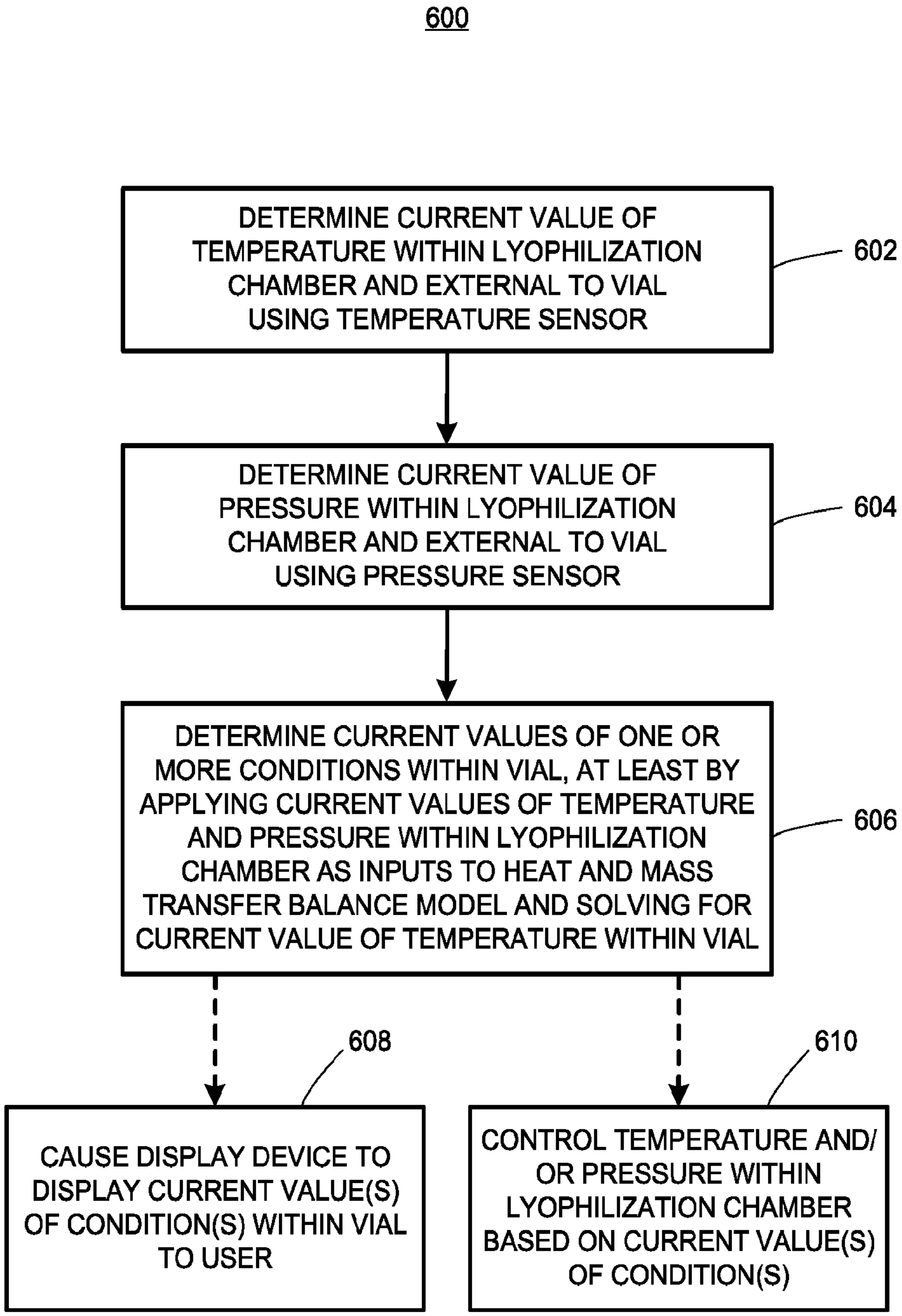
FIG. 6 is a flow diagram of an example method of facilitating real-time monitoring of conditions within a vial during a lyophilization process occurring within a lyophilization chamber.

FIG. 6 is a flow diagram of an example method 600 of facilitating real-time monitoring of conditions within a vial (e.g., vial 104) during a lyophilization process within a lyophilization chamber (e.g., chamber 102). The method 600 may be implemented by a system such as the system 100 of FIG. 1 or the system 400 of FIG. 4 (e.g., by the processing unit 120 executing instructions of the lyophilization monitoring application 130). In some embodiments, blocks 602 and 604 are performed by the measuring unit 140, block 606 is performed by the prediction unit 142, and block 608 and/or block 610 is/are performed by the GUI unit 144 and/or the control unit 402, respectively.

At block 602, a current value of a temperature within the lyophilization chamber, but external to the vial, is determined using a temperature sensor (e.g., sensor 116). The temperature may be a measured temperature of a lyophilization shelf (e.g., shelf 306), such as $T_{shelf}$ of Equation (3), for example. In some embodiments, block 602 includes electronically receiving the current value from the temperature sensor (e.g., by sampling the temperature value, or by receiving a response to a measurement request, etc.).

At block 604, a current value of a pressure within the lyophilization chamber, but external to the vial, is determined using a pressure sensor (e.g., sensor 118). The pressure may be $P_{chamber}$ of Equations (4) and (5), for example. In some embodiments, block 604 includes electronically receiving the current value from the pressure sensor (e.g., by sampling the pressure value, or by receiving a response to a measurement request, etc.).

Blocks 602 and 604 may each be repeated once for each of a plurality of time intervals. The time intervals may be regular/periodic time intervals, such as once every minute, every two minutes, every five minutes, every 10 minutes, or some other suitable period of time.

For each given time interval, after the current temperature and pressure values are determined at blocks 602 and 604, current values of one or more conditions within the vial are determined at block 606. The in-vial conditions may include a product temperature (e.g., $T_{product}$ from Equations (3) and (8)), an amount (e.g., fraction) of water removed from (or, alternatively, remaining within) the product (e.g., as determined based on $$\frac{d(\text{mass}_{ice})}{dt}$$

or $\text{mass}_{ice}$ from Equation (2) or (9), and/or one or more other in-vial conditions (e.g., sublimation surface pressure, etc.).

Block 606 includes applying the current temperature and pressure values determined at blocks 602 and 604 as inputs to a heat and mass transfer balance model (e.g., model 146), and solving for the in-vial condition(s), including at least the in-vial temperature (e.g., $T_{product}$). References herein to "determining," "calculating" or "solving for" values using a model, or "applying" inputs to a model, etc., can refer to direct execution of the model (e.g., by the model server 108 in a web services embodiment), but also encompass remote utilization of the model (e.g., by the computing system 106 when communicating with the model server 108 in a web services embodiment). Thus, for example, the computing system 106 may perform block 606 by sending measured temperature/pressure values to the model server 108 and requesting that the server 108 apply those values to the model 146 and return the corresponding model outputs.

The method 600 also includes, for each given time interval, block 608 and/or block 610, depending on the embodiment. In block 608, a display device (e.g., the display device 124 or a similar device of the user station 112) is caused to display the current value(s) of the in-vial condition(s) that were determined at block 606. For example, the GUI unit 144 may perform block 608 by populating or generating a user interface (e.g., user interface 500, and possibly also current and predicted amounts (e.g., fractions) of water removed from the product via sublimation, etc.) that is displayed to a user. Block 608 may more generally include providing efficient monitoring and/or troubleshooting tools for a real-time platform, to assist the user in making critical decisions relating to the lyophilization process. In block 610, a temperature and/or pressure within the lyophilization chamber is controlled based on the current value(s) of the in-vial condition(s) that was/were determined at block 606. For example, the control unit 402 may perform block 610 by generating one or more feedback signals based on the current value(s) of the in-vial condition(s), and by causing the computing system 106 to send the feedback signal(s) to the controller(s) 404.

In some embodiments, the method 600 includes one or more additional blocks not shown in FIG. 6. For example, the method 600 may include an additional block in which, after each time interval of the plurality of time intervals, one or more future values of the in-vial condition(s) (corresponding to one or more future time intervals) is/are predicted. In such an embodiment, block 608 may further include causing the display device to display the future value(s), and/or block 610 may further include using the future value(s) to control the temperature and/or pressure within the chamber.

Additional considerations pertaining to this disclosure will now be addressed.

Some of the figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components.

Embodiments of the disclosure relate to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices;

magneto-optical media such as optical disks; and hardware devices that are specially configured to store and execute program code, such as ASICs, programmable logic devices ("PLDs"), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

As used herein, the singular terms "a," "an," and "the" may include plural referents, unless the context clearly dictates otherwise.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations are not necessarily drawn to scale. There may be distinctions between the artistic renditions in the present disclosure and the actual apparatus due to manufacturing processes, tolerances and/or other reasons. There may be other embodiments of the present disclosure which are not specifically illustrated. The specification (other than the claims) and drawings are to be regarded as illustrative rather than restrictive. Modifications may be made to adapt a particular situation, material, composition of matter, technique, or process to the objective, spirit and scope of the present disclosure. All such modifications are intended to be within the scope of the claims appended hereto. While the techniques disclosed herein have been described with reference to particular operations performed in a particular order, it will be understood that these operations may be combined, sub-divided, or re-ordered to form an equivalent technique without departing from the teachings of the present disclosure. Accordingly, unless specifically indicated herein, the order and grouping of the operations are not limitations of the present disclosure.

What is claimed:

1. A method of facilitating real-time monitoring of conditions within a vial during a lyophilization process occurring within a lyophilization chamber, the method comprising:

for each time interval of a plurality of time intervals during the lyophilization process, determining (i) a current value of a temperature within the lyophilization chamber and external to the vial using a temperature sensor, and (ii) a current value of a pressure within the lyophilization chamber and external to the vial using a pressure sensor; and after each time interval of the plurality of time intervals, determining, by one or more processors, current values of one or more conditions within the vial, at least by (i) applying the current values of the temperature and the pressure within the lyophilization chamber as inputs to a heat and mass transfer balance model, and (ii) solving for a current value of a temperature within the vial, predicting, by the one or more processors, one or more future values of the one or more conditions within the vial corresponding to one or more future time intervals; and one or both of causing, by the one or more processors, a display device to display the current and/or predicted future values of the one or more conditions within the vial to a user, and controlling, by the one or more processors and based on the current and/or predicted future values of the one or more conditions within the vial, (i) the temperature within the lyophilization chamber and/or (ii) the pressure within the lyophilization chamber.

2. The method of claim 1, wherein determining the current values of the one or more conditions within the vial further comprises solving for a current amount of water removed from, or remaining within, a product within the vial.

3. The method of claim 1, wherein determining the current value of the temperature within the lyophilization chamber comprises determining a current value of a temperature of a shelf that supports the vial within the lyophilization chamber.

4. The method of claim 1, wherein determining the current values of the one or more conditions within the vial comprises applying the current values of the temperature and the pressure within the lyophilization chamber, and one or more properties of the lyophilization chamber and/or the vial, as inputs to the heat and mass transfer balance model.

5. The method of claim 4, wherein the one or more properties of the lyophilization chamber and/or the vial include a heat and mass transfer coefficient associated with the lyophilization chamber and the vial.

6. The method of claim 1, wherein determining the current values of the one or more conditions within the vial comprises applying the current values of the temperature and the pressure within the lyophilization chamber, and one or more properties of a product within the vial, as inputs to the heat and mass transfer balance model.

7. The method of claim 6, wherein the one or more properties of the product include a cake resistance of the product.

8. The method of claim 1, comprising controlling the temperature and/or the pressure within the lyophilization chamber by using the current values of the one or more current conditions within the vial to provide one or more feedback signals to one or more controllers.

9. The method of claim 1, comprising causing the display device to display the current values of the one or more conditions within the vial to the user.

10. The method of claim 9, comprising:

causing the display device to dynamically update one or more graphs indicating changes over time of (i) the temperature and the pressure within the lyophilization chamber, and/or (ii) the conditions within the vial.

11. The method of claim 1, further comprising, after each time interval of the plurality of time intervals:

causing, by the one or more processors, the display device to display the one or more future values of the one or more conditions within the vial to the user.

12. The method of claim 11, wherein predicting the one or more future values includes assuming a constant temperature and pressure within the lyophilization chamber over the one or more future time intervals.

13. A system for facilitating real-time monitoring of conditions within a vial during a lyophilization process occurring within a lyophilization chamber, the system comprising:

the lyophilization chamber configured to hold the vial;

a temperature sensor configured to measure a temperature within the lyophilization chamber and external to the vial;

a pressure sensor configured to measure a pressure within the lyophilization chamber and external to the vial; and a computing system configured to for each time interval of a plurality of time intervals during a lyophilization process occurring within the lyophilization chamber, obtain (i) a current value of the temperature within the lyophilization chamber from the temperature sensor, and (ii) a current value of the pressure within the lyophilization chamber from the pressure sensor, and after each time interval of the plurality of time intervals, determine current values of one or more conditions within the vial, at least by (i) applying the current value of the temperature and the pressure within the lyophilization chamber as inputs to a heat and mass transfer balance model, and (ii) solving for a current value of a temperature within the vial, predict one or more future values of the one or more conditions within the vial corresponding to one or more future time intervals, and one or both of cause a display device to display the current and/or predicted future values of the one or more conditions within the vial to a user, and control, based on the current and/or predicted future values of the one or more conditions within the vial, (i) the temperature within the lyophilization chamber and/or (ii) the pressure within the lyophilization chamber.

14. The system of claim 13, wherein determining the current values of the one or more conditions within the vial further includes solving for a current amount of water removed from, or remaining within, a product within the vial.

15. The system of claim 13, wherein the temperature within the lyophilization chamber includes a temperature of a shelf that supports the vial within the lyophilization chamber.

16. The system of claim 13, wherein the computing system is configured to determine the current values of the one or more conditions within the vial at least by applying (i) the current values of the temperature and the pressure within the lyophilization chamber, (ii) one or more properties of the lyophilization chamber and/or the vial, and (iii) one or more properties of a product within the vial, as inputs to the heat and mass transfer balance model.

17. The system of claim 16, wherein the one or more properties of the lyophilization chamber and/or the vial include a heat transfer coefficient associated with the lyophilization chamber and the vial, and wherein the one or more properties of the product include a cake resistance of the product.

18. The system of claim 13, further comprising:

one or more controllers configured to control the temperature within the lyophilization chamber, wherein the computing system is configured to control the temperature and/or the pressure within the lyophilization chamber by using the current values of the one or more current conditions within the vial to provide one or more feedback signals to the one or more controllers.

19. The system of claim 13, further comprising:

the display device, wherein the computing system is configured to cause the display device to display the current values of the one or more conditions within the vial to the user.

20. The system of claim 19, wherein the computing system is configured to cause the display device to dynamically update one or more graphs indicating changes over time of (i) the temperature and the pressure within the lyophilization chamber, and/or (ii) the conditions within the vial.

21. The system of claim 13, wherein the computing system is further configured to, after each time interval of the plurality of time intervals:

cause the display device to display the one or more future values of the one or more conditions within the vial to the user.

22. One or more non-transitory computer-readable media storing instructions for facilitating real-time monitoring of conditions within a vial during a lyophilization process occurring within a lyophilization chamber that, when executed by one or more processors, cause the one or more processors to:

for each time interval of a plurality of time intervals during the lyophilization process, determine (i) a current value of a temperature within the lyophilization chamber and external to the vial using a temperature sensor, and (ii) a current value of a pressure within the lyophilization chamber and external to the vial using a pressure sensor; and after each time interval of the plurality of time intervals, determine current values of one or more conditions within the vial, at least by (i) applying the current values of the temperature and the pressure within the lyophilization chamber as inputs to a heat and mass transfer balance model, and (ii) solving for a current value of a temperature within the vial, predict one or more future values of the one or more conditions within the vial corresponding to one or more future time intervals, and one or both of cause a display device to display the current and/or predicted future values of the one or more conditions within the vial to a user, and control, based on the current and/or predicted future values of the one or more conditions within the vial, (i) the temperature within the lyophilization chamber and/or (ii) the pressure within the lyophilization chamber.

23. The one or more non-transitory computer-readable media of claim 22, wherein determining the current values of the one or more conditions within the vial further includes solving for a current amount of water removed from, or remaining within, a product within the vial.

24. The one or more non-transitory computer-readable media of claim 22, wherein determining the current values of the one or more conditions within the vial includes applying the current values of the temperature and the pressure within the lyophilization chamber, (ii) one or more properties of the lyophilization chamber and/or the vial, and (iii) one or more properties of a product within the vial, as inputs to the heat and mass transfer balance model.

25. The one or more non-transitory computer-readable media of claim 24, wherein the one or more properties of the lyophilization chamber and/or the vial include a heat transfer coefficient associated with the lyophilization chamber and the vial, and wherein the one or more properties of the product include a cake resistance of the product.

26. The one or more non-transitory computer-readable media of claim 22, wherein the instructions cause the one or more processors to control the temperature and/or the pressure within the lyophilization chamber by using the current values of the one or more current conditions within the vial to provide one or more feedback signals to one or more controllers.

27. The one or more non-transitory computer-readable media of claim 22, wherein the instruction cause the one or more processors to:

cause the display device to display the current values of the one or more conditions within the vial to the user.

28. The one or more non-transitory computer-readable media of claim 27, wherein the instructions cause the one or more processors to:

cause the display device to dynamically update one or more graphs indicating changes over time of (i) the temperature and the pressure within the lyophilization chamber, and/or (ii) the conditions within the vial.

29. The one or more non-transitory computer-readable media of claim 22, wherein the instructions further cause the one or more processors to, after each time interval of the plurality of time intervals:

cause the display device to display the one or more future values of the one or more conditions within the vial to the user.

* * * * *